UNITED STATES PATENT OFFICE 2,161,825

MANUFACTURE OF COPPER SALTS

Ernst Kuss, Kurt Horalek, and Oskar Emert, Duisburg, Germany, assignors of one-half to Duisburger Kupferhutte, Duisburg, Germany, and one-half to I. G. Farbenindustrie Aktiengesellschaft, Frankfort-on-the-Main, Germany No Drawing. Application April 6, 1937, Serial No. 135,294. In Germany March 14, 1934

3 Claims. (Cl. 23—117)

This invention relates to the manufacture of copper salts from solutions which are obtained by lixiviating chlorinated roasted burnt pyrites containing copper.

For the commercial production of copper salts copper sulfate which is usually obtained from metallic copper is in most cases employed as starting material. Copper sulfate is also produced from naturally occurring oxidic ores or from ores which have been subjected to a sulfating roasting. The copper which is obtained by chlorinating roasting from roasted pyrites is however separated chiefly as precipitated copper, either directly or also indirectly, for instance by way of cuprous chloride. Other processes which are mentioned in the literature relating to the working up of the solutions obtained in chlorinating roasting have not attained any technical importance, because the acid ions of the solutions are not utilized.

In accordance with the present invention from the solutions obtained by lixiviating chlorinated roasted burnt pyrites containing copper, copper salts are obtained by separating the copper primarily and selectively while utilizing the copper and acid ions of the solution in the form of sodium sulfate-copper sulfate-double salt, and transforming this salt into pure copper salts having the same acid anion. These solutions contain besides iron, manganese, cobalt, lead, silver and arsenic, zinc and more than 10 g. of copper, 30 g. of sodium, 50 g. of chlorine and 20 g. of sulfur in one liter.

For separating the sodium sulfate-copper sulfate-double salt the solution is kept in motion for some time at a temperature of above 15° C. It is suitable to select a temperature higher than 50° C. in order to obtain a technically favorable rate of separation of the double salt.

The chlorinating roasting is effected under different conditions. Sometimes the burnt pyrite is roasted with 4 and 5% of sodium chloride and sometimes with 12% of sodium chloride. For separating the double salt as quickly and completely as possible the sodium ion concentration is of great importance. It is therefore advantageous to increase the sodium ion concentration if the addition of sodium chloride during roasting was small. Increase of the sodium ion concentration can be effected either by the addition of sodium chloride or of sodium sulfate. By the addition of sodium chloride the solubility of the copper sulfate-sodium sulfate-double salt is diminished while the chlorine ion concentration is increased, so that no zinc is precipitated. Advantageously so much common salt is added that the solution contains more than 100 g. of chlorine ions per liter. At a high chlorine ion content of the solutions obtained by lixiviating chlorinated roasted burnt pyrites this increase of the sodium ion concentration can be effected by the addition of sodium sulfate, without zinc precipitating during the separation of the double salt. The separated double salt may be worked up directly or after further purification. The working up may be carried out in the same manner as when using copper sulfate as initial material.

The invention is further illustrated by the following examples without being restricted thereto.

Example 1

To 50 cu. m. of a solution containing per liter 42 grams of copper, 50 grams of zinc, 59 grams of sodium, 60 grams of sulfur in the form of sulfate ions and 90 grams of chlorine and which also contains cobalt, manganese, iron, silver, lead and arsenic, 6 tons of common salt are added and the mixture is well stirred in a rotating drum for about 3 hours at about 50° C. During this time about 7 tons of sodium sulfate-copper sulfate-double salt separate which are filtered and washed.

A part of this salt is dissolved in water while stirring and sodium carbonate is added thereto. Basic copper sulfate separates which is filtered and washed.

Example 2

To 10 cu. m. of a solution containing 40 grams of copper, 5 grams of zinc, 49 grams of sodium, 30 grams of sulfur in the form of sulfate ions and 75 grams of chlorine in one liter containing besides iron, manganese, cobalt, lead, silver and arsenic 1 ton of sodium chloride contaminated by magnesium and potassium chlorides are added and 1.5 tons of anhydrous sodium sulfate are further added. The reaction mixture is then stirred at about 40° C. for about 4 hours. During that time about 1.5 tons of sodium sulfate-copper sulfate-double salt precipitate which are worked up to pure copper sulfate.

This is a continuation in part of our copending application for Letters Patent Serial No. 10,584, filed March 11, 1935.

We claim:

1. Process of preparing substantially zinc free sodium sulfate-copper sulfate double salt which comprises lixiviating chlorinated roasted burnt pyrites to obtain a solution containing iron, manganese, cobalt, lead, silver and arsenic as well as substantial amounts of zinc and more than 10 grams of copper, 30 grams of sodium, 50 grams of chlorine and 20 grams of sulfur per liter, increasing the sodium ion concentration of said solution by the addition of a water soluble sodium salt to the solution at a temperature above 15° C., agitating the solution for several hours and separating the precipitated substantially zinc free sodium sulfate-copper sulfate double salt from the solution containing the dissolved zinc and other metal salts.

2. Process of preparing substantially zinc free sodium sulfate-copper sulfate double salt which comprises lixiviating chlorinated roasted burnt pyrites to obtain a solution containing iron, manganese, cobalt, lead, silver and arsenic as well as substantial amounts of zinc and more than 10 grams of copper, 30 grams of sodium, 50 grams of chlorine and 20 grams of sulfur per liter, increasing the sodium ion concentration of said solution by the addition of sodium chloride to the solution at a temperature above 15° C., agitating the solution for several hours and separating the precipitated substantially zinc free sodium sulfate-copper sulfate double salt from the solution containing the dissolved zinc and other metal salts.

3. Process of preparing substantially zinc free sodium sulfate-copper sulfate double salt which comprises lixiviating chlorinated roasted burnt pyrites to obtain a solution containing iron, manganese, cobalt, lead, silver and arsenic as well as substantial amounts of zinc and more than 10 grams of copper, 30 grams of sodium, 50 grams of chlorine and 20 grams of sulfur per liter, increasing the sodium ion concentration of said solution by the addition of sodium sulfate to the solution at a temperature above 15° C., agitating the solution for several hours and separating the precipitated substantially zinc free sodium sulfate-copper sulfate double salt from the solution containing the dissolved zinc and other metal salts.

ERNST KUSS.
KURT HORALEK.
OSKAR EMERT.